(12) United States Patent
Gabrys et al.

(10) Patent No.: US 7,053,589 B2
(45) Date of Patent: May 30, 2006

(54) LONG-LIFE VACUUM SYSTEM FOR ENERGY STORAGE FLYWHEELS

(76) Inventors: Christopher W. Gabrys, 900 S. Meadows Pkwy., #3513, Reno, NV (US) 89511; David R. Campbell, 6850 Sharlands Ave., #W1137, Reno, NV (US) 89523

( * ) Notice: Subject to any disclaimer, the term of this patent is extended or adjusted under 35 U.S.C. 154(b) by 91 days.

(21) Appl. No.: 10/344,442

(22) PCT Filed: Aug. 10, 2001

(86) PCT No.: PCT/US01/25199

§ 371 (c)(1),
(2), (4) Date: Aug. 8, 2003

(87) PCT Pub. No.: WO02/15366

PCT Pub. Date: Feb. 21, 2002

(65) Prior Publication Data

US 2004/0051507 A1    Mar. 18, 2004

Related U.S. Application Data

(60) Provisional application No. 60/257,936, filed on Dec. 20, 2000, provisional application No. 60/237,310, filed on Oct. 2, 2000, provisional application No. 60/224,463, filed on Aug. 10, 2000.

(51) Int. Cl.
| | |
|---|---|
| *H02K 7/02* | (2006.01) |
| *H02K 16/00* | (2006.01) |
| *H02K 47/04* | (2006.01) |
| *F16F 15/30* | (2006.01) |
| *H02P 9/42* | (2006.01) |

(52) U.S. Cl. .............................. 322/4; 322/40; 74/572; 310/90.5; 310/74; 417/51

(58) Field of Classification Search .................... 322/4, 322/40; 310/90.5, 74; 74/572; 417/51
See application file for complete search history.

(56) References Cited

U.S. PATENT DOCUMENTS

| | | | | |
|---|---|---|---|---|
| 2,748,039 | A | * | 5/1956 | Adams et al. ............... 148/593 |
| 2,926,981 | A | * | 3/1960 | Stout et al. .................... 445/55 |
| 3,603,704 | A | * | 9/1971 | Zucchinelli et al. ........... 417/51 |
| 3,609,062 | A | * | 9/1971 | Zucchinelli et al. ........... 417/48 |
| 3,609,064 | A | * | 9/1971 | Giorgi et al. .................. 417/51 |
| 3,780,501 | A | * | 12/1973 | Porta et al. .................... 96/146 |
| 3,961,897 | A | * | 6/1976 | Giorgi et al. ................ 422/240 |

(Continued)

*Primary Examiner*—Darren Schuberg
*Assistant Examiner*—Pedro J. Cuevas
(74) *Attorney, Agent, or Firm*—J. Michael Neary (57) ABSTRACT

The invention, intended primarily for use in a steel flywheel power source (30), provides a vacuum system and a method of maintaining a vacuum inside a flywheel chamber (32) for the life of the power source (30). The vacuum system combines the use of cleaning and de-gassing treatments in the chamber (32) and vacuum tempering of the steel flywheel (31) with the use of a chemical type metal alloy nonevaporable getter, such as zirconium-vanadium-iron, that cooperatively matches the outgassing of the flywheel (31) and chamber (32) by sorbing those gases that are released. The getter may be reactivated throughout the life of the flywheel system by reheating it with an integral heater that is triggered by a timer instead of a vacuum gauge to increase the system reliability, using power taken directly from the energy stored in the flywheel. The electronics (45) of the flywheel power source are used to signal an alarm or prevent achieving or maintaining full speed of the flywheel when the vacuum in the chamber degrades.

20 Claims, 4 Drawing Sheets

U.S. PATENT DOCUMENTS

| | | | | |
|---|---|---|---|---|
| 3,970,917 A * | 7/1976 | Diggs | | 322/4 |
| 4,082,834 A * | 4/1978 | Grossman et al. | | 423/210 |
| 4,137,012 A * | 1/1979 | della Porta et al. | | 417/51 |
| 4,182,138 A * | 1/1980 | McGuire | | 464/92 |
| 4,200,460 A * | 4/1980 | Grossman et al. | | 420/422 |
| 4,223,240 A * | 9/1980 | Theyse | | 310/74 |
| 4,286,475 A * | 9/1981 | Friedericy et al. | | 74/572 |
| 4,306,167 A * | 12/1981 | Tomite et al. | | 310/153 |
| 4,312,669 A | 1/1982 | Boffito et al. | | 420/422 |
| 4,406,950 A * | 9/1983 | Roesel, Jr. | | 290/4 C |
| 4,412,170 A * | 10/1983 | Roesel, Jr. | | 322/4 |
| 4,444,444 A | 4/1984 | Benedetti et al. | | 310/90.5 |
| 4,458,400 A * | 7/1984 | Friedericy et al. | | 29/894 |
| 4,680,984 A * | 7/1987 | Wahling et al. | | 74/574 |
| 4,743,167 A * | 5/1988 | Martelli et al. | | 417/51 |
| 4,873,962 A * | 10/1989 | Safranek | | 123/599 |
| 4,996,016 A * | 2/1991 | Walls et al. | | 264/229 |
| 5,069,379 A * | 12/1991 | Kerrigan | | 227/131 |
| 5,154,582 A | 10/1992 | Danielson | | 417/51 |
| 5,285,699 A * | 2/1994 | Walls et al. | | 74/572 |
| 5,398,571 A * | 3/1995 | Lewis | | 74/572 |
| 5,462,402 A * | 10/1995 | Bakholdin et al. | | 415/90 |
| 5,614,777 A * | 3/1997 | Bitterly et al. | | 310/74 |
| 5,760,508 A | 6/1998 | Jennings et al. | | 310/74 |
| 5,767,595 A * | 6/1998 | Rosen | | 310/74 |
| 5,912,519 A | 6/1999 | Horner et al. | | 310/74 |
| 5,924,335 A * | 7/1999 | Kuklo | | 74/572 |
| 5,941,132 A * | 8/1999 | Kuklo | | 74/572 |
| 5,969,446 A * | 10/1999 | Eisenhaure et al. | | 310/74 |
| 6,136,110 A * | 10/2000 | Hashimoto et al. | | 148/622 |
| 6,144,128 A * | 11/2000 | Rosen | | 310/74 |
| 6,150,742 A * | 11/2000 | Horner et al. | | 310/74 |
| 6,175,172 B1 * | 1/2001 | Bakholdin et al. | | 310/74 |
| 6,262,505 B1 * | 7/2001 | Hockney et al. | | 310/90.5 |
| 6,347,925 B1 * | 2/2002 | Woodard et al. | | 417/51 |
| 6,352,008 B1 * | 3/2002 | Matsuoka et al. | | 74/572 |
| 6,486,627 B1 * | 11/2002 | Gabrys | | 318/161 |
| 6,570,286 B1 * | 5/2003 | Gabrys | | 310/90.5 |
| 6,585,490 B1 * | 7/2003 | Gabrys et al. | | 417/51 |
| 6,642,682 B1 * | 11/2003 | Perkins et al. | | 318/436 |
| 6,710,489 B1 * | 3/2004 | Gabrys | | 310/90.5 |
| 6,750,588 B1 * | 6/2004 | Gabrys | | 310/268 |
| 6,784,562 B1 * | 8/2004 | Gennesseaux | | 290/2 |
| 6,798,092 B1 * | 9/2004 | Gabrys et al. | | 310/45 |
| 6,825,588 B1 * | 11/2004 | Gabrys et al. | | 310/90.5 |
| 6,828,710 B1 * | 12/2004 | Gabrys | | 310/179 |
| 6,884,039 B1 * | 4/2005 | Woodard et al. | | 417/51 |

* cited by examiner

LONG-LIFE VACUUM SYSTEM FOR ENERGY STORAGE FLYWHEELS

This is related to U.S. Provisional Applications No. 60/224,463 filed on Aug. 10, 2000, No. 60/237,310 filed on Oct. 2, 2000, and No. 60/257,936 filed on Dec. 20, 2000 and to International Application PCT/US01/25199 filed on Aug. 10, 2001 and entitled "Long-Life Vacuum System for Energy Storage Flywheels, which was published by the World International Patent Organization as International Publication No. WO 02/15366 on Feb. 21, 2002.

This invention pertains to a vacuum system for energy storage flywheels and more particularly to a vacuum system and method of maintaining vacuum in a flywheel power source that employs a steel flywheel for storing energy. The vacuum system maintains the required low pressure inside a flywheel chamber to prevent excessive aerodynamic drag for the life of the power source and is reliable, maintenance-free and low cost.

BACKGROUND OF THE INVENTION

Flywheels have been used for many years as energy storage devices. They have often been used as power smoothing mechanisms for internal combustion engines and other kinds of power equipment. More recently, flywheels have been recognized as a very attractive energy storage technology for such electrical applications as uninterruptible power supplied utility load leveling systems and electric vehicles.

Modern flywheel energy storage systems convert back and forth between a spinning flywheel's rotational energy and electrical energy. A flywheel energy storage stem includes a flywheel, a motor generator, a bearing system and a vacuum enclosure. The rotating flywheel stores mechanical energy, the motor generator converts electrical or mechanical energy to mechanical or electrical energy, respectively, and the bearing system physically supports the rotating flywheel.

In almost all energy storage applications, whether quick discharge type (power ride-through), where discharge time is measured in seconds, or long-term discharge type (power backup), where discharge time is measured in hours, flywheels directly compete with electrochemical batteries. Two key advantages of flywheels used for electrical energy storage over electrochemical battery systems are its longevity and reliability. Electrochemical batteries, in particular, lead-acid batteries, have short lifetimes, between six months and seven years depending on operating conditions. These batteries require periodic maintenance and can fail unpredictably. In contrast, flywheel energy storage systems are expected to have maintenance-free lifetimes of twenty years.

To achieve a maintenance-free life of many years, the vacuum system that is used to prevent excessive drag and aerodynamic heating of the flywheel must be capable of reliably maintaining an adequate level of vacuum. To date several approaches have been used to create and or maintain vacuum in flywheel systems. The simplest and most widely used approach is to attach an external mechanical vacuum pump to the flywheel chamber. The vacuum pump can then either run continuously or can just turn on when a vacuum gauge indicates that the vacuum has reached an unacceptable pressure. In either case, most vacuum pumps require regular maintenance and have less than twenty-year lives along with the vacuum gauges.

Another method for creating vacuum in a flywheel chamber is to use the flywheel's rotation to drive a molecular drag pump. The flywheel shaft spans two different chambers and a drag pump gear on the shaft pumps gases from the flywheel chamber to the external chamber. The external chamber, which is at a higher pressure, contains physical type getters to trap the gas molecules. Unfortunately, the drag pump is very inefficient at low speeds and could cause the flywheel to take a much longer time to reach full speed if the vacuum level is substantially low. The physical type getters are also found to be not very effective at ambient temperatures either.

Vacuum creation schemes for flywheel systems have also included using pumping action directly from the rotating flywheel itself with the molecules passing through a semiporous membrane surrounding the flywheel to create the vacuum It is not clear what membrane material could perform this function although, if possible, the structure is likely expensive. Not to mention, this method also suffers from having a lack of vacuum until the flywheel is at high speed. Thus the charging of the flywheel power source would take an extended period of time and much excess power.

To get around the problems of excess low speed drag loss, it is preferable to always have an adequate vacuum regardless of the flywheel speed. Physical type getters such as activated charcoal or zeolites have been proposed for use in sorbing large quantities of gases. Physical type getters trap molecules by having a very porous internal structure in which a small volume of material has an extremely large surface area to which molecules can stick. Unfortunately, as described above, sorption is related to temperature and at room temperature their efficiency is very poor because of the higher energy of the molecules preventing or inhibiting their sticking. They also are not effective for sorbing hydrogen, which may be the largest outgassing component depending on the type of flywheel's construction To get around the temperature dependence problems of physical getters, evaporable chemical type getters have been proposed. Evaporable getters work by having a base getter material that is continuously heated and vaporized inside the flywheel chamber. The material that is vaporized will condense on the inner walls of the chamber as a clean surface. The clean surface then allows chemical adsorption of gas molecules, which maintains the vacuum. This method can be maintenance-free if enough getter material is included with the flywheel power source. Unfortunately, non-evaporable getters are best suited for very low pressure vacuum because the film can only be deposited at a slow rate. Thus, the gas molecules of a medium pressure vacuum, which is all that is required for a rotating flywheel, would overpower the getter. The getter would also have a limited life.

Compounding the problems of mining the vacuum for an extremely long time inside a flywheel power source, flywheel systems have a couple of uniquely problematic attributes compared with other evacuated devices. Flywheel systems have an unusually large internal surface area for their enclosed volume. The large surface area, which is the result of filling the chamber mostly with the flywheel creates much higher gas evolution For performance reasons, such as reducing the turbulent drag on the flywheel through reduction of the gap between the flywheel and the stationary chamber walls, as well as for shipping and handling purposes, the size of the flywheel chamber is preferably made small. The lower internal volume from the large internal flywheel and small outer chamber means that the internal volume becomes very small. Thus, it does not take much outgassing of molecules before the pressure inside the chamber rises to acceptable levels.

SUMMARY OF THE INVENTION

The invention is a vacuum system and method of maintaining vacuum in a flywheel power source that maintains the low pressure inside a flywheel chamber for the life of the power source. The vacuum system works by combining the use of a steel flywheel housed inside a metal vacuum chamber of the power source, with the use of a chemical type metal alloy non-evaporable getter that cooperatively matches the outgassing of the flywheel and chamber by sorbing those gases that are released. In contra, use of higher speed and lighter weight composite material flywheels for storing energy in the power source would result in up to 1000 times or greater outgassing load, which would make removal of the gases by this method extremely difficult. Not only would the quantity and rate of gas evolution be extremely large for a system employing a composite material flywheel, the gases include much water vapor as well as larger molecules which are much more difficult to getter by chemical type getters. The use of a steel flywheel has been found to outgas primarily hydrogen and this is gas most readily sorbed by the chemical type metal alloy non-evaporable chemical type getters. In contrast, physical type getters are can not effectively trap hydrogen Although, steel flywheels contain nearly 70 times more internal nitrogen gas, the hydrogen is many times more soluble in the steel and thus outgases at a higher rate. Therefore, sorbing the large quantity of hydrogen is required to maintain the vacuum. Because both the getter material and the flywheel are constructed of metals, it becomes understandable that both would have similar differing solubilities for different gasses. The hydrogen that is readily released from the flywheel in vacuum due to its higher internal concentration, becomes readily sorbed by the alloy getter material. Other gases such as carbon monoxide, carbon dioxide, nitrogen and oxygen are also outgassed and sorbed, but at slower rates. The non-evaporable getter has the ability to take in these gases at a lower temperature than the steel of the flywheel because of the elements in its construction and because of use of alloying which lowers the activation and operation temperature. One common commercially available metal alloy non-evaporable getter material that is preferable for use with the invention is zirconium-vanadium-iron Hydrogen is uniquely absorbed to the center of the getter material, while other gases stick to the getter surface until the getter is reactivated by heating it such the gases permeate to the center also. The non-evaporable getter material is preferably in the form of granular or other finely divided form such as pellets or grains, so that it has a larger volume of material than in coated strip form and the capacity for hydrogen becomes extremely large matching the outgassing of the flywheel for the life of the system.

In one embodiment of the invention, the getter in the flywheel power source is reactivated throughout the life of the flywheel system by reheating it through use of an integral heater. The heater is preferably triggered by a timer instead of a vacuum gauge to increase the system reliability. The power for the heater can be taken directly from the energy stored in the flywheel. When the getter is being reactivated, some stored hydrogen becomes released and is later sorbed. Because the flywheel is constructed of steel, it has a high thermal conductivity, capacity and capability along with a lower operating tip speed because of its mass. This makes the release of hydrogen during reactivation not problematic when the flywheel is spinning. The vacuum can be regenerated without shutting the system down Although it is common to heat non-evaporable getters continuously in operation at a lower temperature than the activation temperature to increase the sorption rate of gases, this could potentially use up the getter in a flywheel system much too quickly by yielding a lower pressure than required for a shorter time.

In a further embodiment of the invention, the outgassing of the steel flywheel can be reduced by performing the steel tempering operation in a vacuum prior to installation in the containment vessel. This reduces the quantity of non-evaporable getter required to maintain the vacuum The steel in the flywheel must be heat treated, quenched and tempered to achieve the high strength and toughness required for high speed operation. The tempering process involves heating the steel to a tempering temperature, in many cases between 800° F. and 1200° F. and holding it at that temperature for several hours. The brittle martensite internal structure produced during heat treatment becomes transformed to tempered martensite. Because the solubility of gases in metals is related to the temperature, the steel flywheel material can have much of its gas removed while being held at this high temperature. Vacuum furnaces are many times used to improve the mechanical properties and appearances of metals. In this case, the use of vacuum in the tempering process reduces the outgassing load of the steel flywheel in operation in vacuum. Upon removal from the tempering, water and other molecules become attached to the material surface and the flywheel outgassing would still benefit from some lower temperature heating during installation of the flywheel system vacuum. However, the longer term outgas rate can be reduced by the process.

In yet a further embodiment of the invention, the electronics of the flywheel power source are used to signal an alarm and or prevent achieving or maintaining fill speed of the flywheel when the pressure in the vacuum chamber is found to be too high. This can be done either by simply current limiting to the motor power since the flywheel is constructed from steel and is less likely to overheat, or alternatively the electronics calculating the drag through use of the motor power, flywheel speed and flywheel acceleration. The calculation method allows the flywheel to detect any vacuum level problems and also any bearing or motor/generator problems prior to accelerating to full speed. The determination of excess drag for a given state of flywheel operation can also be used to trigger reactivation of the getter for improving the vacuum.

DESCRIPTION OF THE PREFERRED EMBODIMENT

Figure 1:
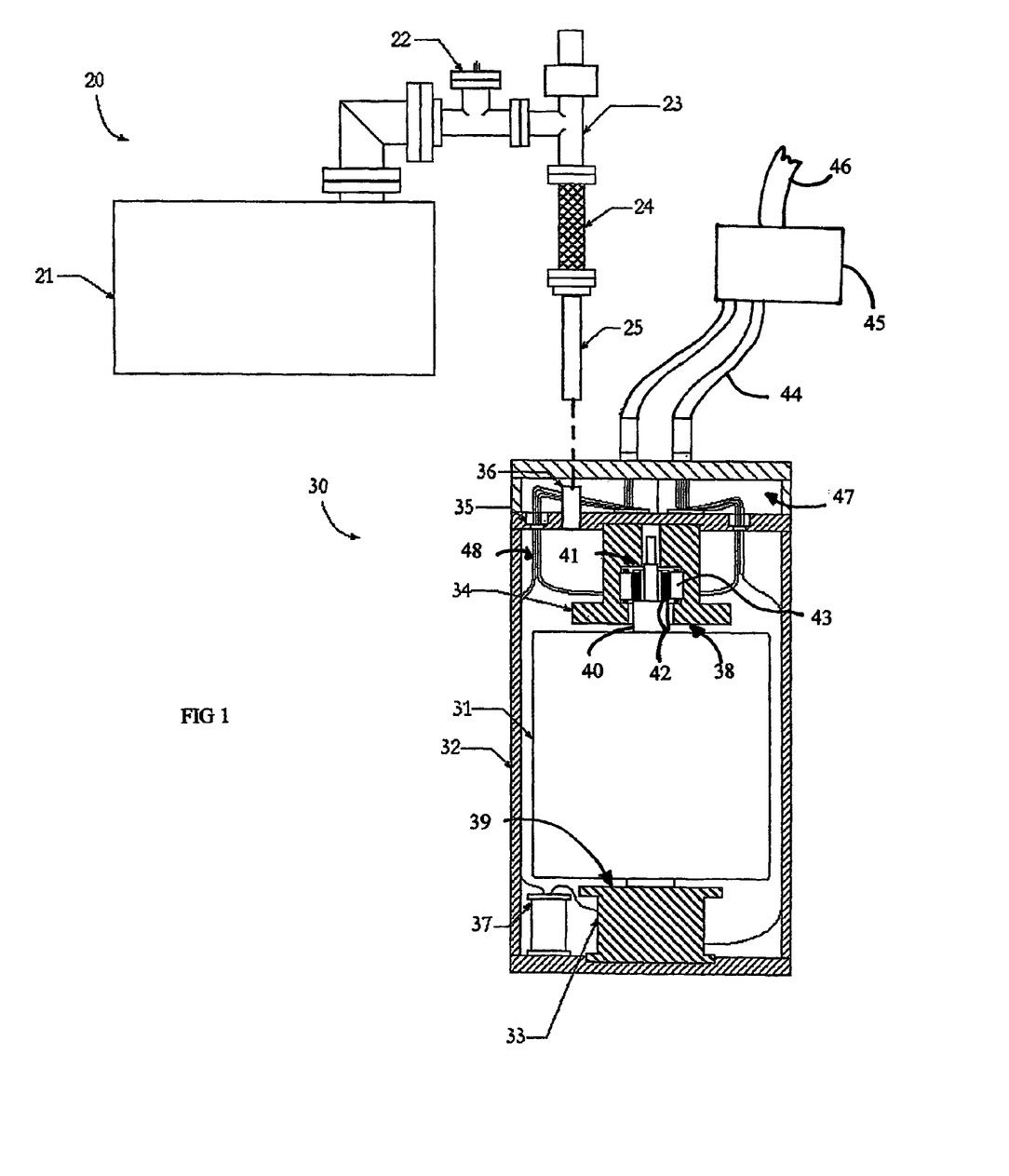
FIG. 1 is a schematic elevation of a flywheel power source with a vacuum system in accordance with the invention.

Tuning to the drawings, wherein like reference characters designate identical or corresponding parts, FIG. 1 shows a flywheel power source 30 that has been disconnected from an external initial vacuum-pumping system 20. In accordance with the invention, the flywheel power source 30 uses a steel flywheel 31 that is enclosed inside a metal chamber 32 for storing energy. The flywheel steel is preferably an alloy for high strength and deep hardenability with 4340 being preferred for having relatively good properties at low cost. The chamber is maintained internally at a low pressure for reduction of aerodynamic drag on the flywheel 31. The container 32 can be constructed of steel, stainless steel aluminum or of other metals, however carbon steel is preferred for low cost. Although some prior art flywheel systems have used 'O' rings or epoxy bonding to seal the vacuum, the vacuum chamber of the invention is preferably sealed using metal welding, brazing or soldering for lower outgassing and gas permeability from the outside of the chamber. Metal gasket seals could be employed but these are expensive in large diameters needed to allow insertion of the flywheel.

The flywheel is supported for rotation about a vertical axis using upper and lower bearings 38 and 39. The bearings 38, 39 can be magnetic, as shown, mechanical or a combination of the two. Use of magnetic bearings has the benefit of not requiring lubricants that could contaminate the vacuum along with a long life without any wear.

To accelerate and decelerate the flywheel 31 for storing and retrieving energy, the flywheel uses an attached motor/generator 41. The motor/generator is preferably of the brushless type so there are no wearing surfaces of generation of particles inside the chamber 32. As shown, the motor/generator is a 3-phase permanent magnet type for high efficiency, however reluctance motor/generator designs can also be used as is well known in the art. It is also contemplated that a separate motor and generator could also be used as well as an integrated flywheel and motor/generator. The motor generator 41 uses permanent magnets 42 that are aced to the flywheel shaft 40 using a thin high strength sleeve, not shown. Rotational torque is generated in cooperation with the magnets 42 using a surrounding laminated ferromagnetic stator 43. The laminations in motor stators are used support the windings mechanically and provide a relatively efficient magnetic flux path for the rotating magnetic fields. Air core motor/generators are also commonly employed in flywheel systems for the purpose of achieving the highest levels of efficiency due to a lack of magnetic iron losses and they also have reduced inductances for increased power delivery response time. Unfortunately, air core motor/generators typically require use of a plastic support structure along with excessive potting to hold the windings and eliminate the losses. These materials outgas significantly and are therefore a laminated ferromagnetic core type motor/generator is preferred for use with the invention.

The flywheel power source 30 preferably also includes a separate non-evacuated chamber 47 for malting electrical connections and for potential placement of some electronics, not shown Power and control wires 48 from the flywheel chamber exit to the non-evacuated chamber 47 through use of electrical feedthroughs 35. Electrical feedthroughs 35 are hermetically sealed connections that allow electrical power to pass into vacuum housing 32 without causing the vacuum to be lost. A vacuum inlet port 36 is used for initially pulling vacuum on the flywheel chamber 32 using the external vacuum pumping system 20. The vacuum inlet port 36 is preferably fabricated from copper tubing for easy crimping and sealing of the vacuum although stainless steel tubing could be used. The port 36 is originally part of connection tube 25, but is crimped off and cut once vacuum-pumping system 20 is no longer required. Crimping off vacuum inlet port 36 from connection tube 25 is the preferred method of disconnecting energy storage flywheel system 30 from vacuum-pumping system 20. Alternatively, a valve could be attached on to the vacuum inlet port 36 and this could be used to seal the vacuum but with more cost.

The flywheel power source 30 can have its control and power conversion electronics 45 inside the non-evacuated chamber 47 or located separately as shown. Interconnection cabling 44 connects the flywheel power source 30 to the control electronics 45 while interface cabling 46 connects the power electronics to utility or auxiliary power sources, not shown. The power electronics 45 converts power from the utility power to energy stored the rotating flywheel 31 and vice-versa The power electronics 45 also control the rate of energy storage and delivery as well as monitor the overall health of the power source 30.

In accordance with the invention, the vacuum inside the flywheel chamber 32 is maintained against the outgassing of the flywheel, chamber and other internal components, after the initial vacuum pumping system 20 has been disconnected, through the use of a chemical type metal alloy non-evaporable getter in the form of a getter pump 37. The non-evaporable getter pump 37 contains preferably pills or pellets of an alloy of special metal alloys that are effective in absorbing hydrogen via solid solution formation and adsorbing various gas species by forming molecular compounds, e.g., nitrides, oxides and carbides, at room temperature. The great affinity to absorb hydrogen by the getter directly matches and cooperates with the majority composed hydrogen gas that outgasses from the flywheel 31 and also the vacuum chamber 32. Use of a composite flywheel would outgas much water vapor and other larger molecules which are not directly absorbed by the non-evaporable getter. Besides the much lower and matched outgassing and sorption with use of a steel flywheel, the steel flywheel also rotates at a lower tip speed, has a higher thermal conductivity and temperature capability than a composite flywheel. Thus, in a steel flywheel system; the main concern for the vacuum level is reduction of drag power loss instead of preventing a surface overheating failure. The required level of vacuum is approximately $10^{-2}$ Torr for a steel flywheel compared to $10^{-3}$ for a composite flywheel which makes the vacuum maintenance another ten times easier.

Alternatively to use of a non-evaporable getter, use of a evaporable getter would have difficulty in keeping up with the higher outgassing rate and also potentially with surviving the life of the flywheel power source. A common physical type getter such as zeolite would also not be effective even in large quantities due to its inability to sorb the small molecules of hydrogen A preferred chemical type non-evaporable getter material for use in the vacuum system is a zirconium-vanadium-iron alloy, in particular an alloy that is 70 weight percent (70 w %) zirconium, 24.6 w % vanadium and 5.4 w % iron, denoted as ST707™ by SAES Getters S.p.A. To activate ST707™ it is heated to 450° C. for 15 minutes within a vacuum enclosure at a pressure of $10^{-4}$ torr or below. A zirconium-aluminum alloy, in particular an alloy that is 84 w % zirconium and 16 w % aluminum denoted as ST 101™ by SAES Getters S.p.A, could be used but it is not preferred because of its very high activation temperature (>700° C.). The use of alloying more than one metal allows the getter to be activated at a lower temperature than a single material would be. Alloys of three or more metals generally, depending on the metals, provide lower activation temperatures that are more easily achieved and are thus preferred.

In one embodiment of the invention, the activation of the getter is done using a heater that is integral with the flywheel power source. The pellets in the pump would be placed in contact with an electric heater. By having a heater integral with the flywheel the getter material can be reactivated when the pressure in the vacuum chamber becomes too high, thereby extending the life of the flywheel system. In the activation process, the non-inert gas species, excluding hydrogen, that have formed molecular compounds with the getter material diffuse from the surface of the getter material into its center, leaving chemically reactive sites on the sure. The getter surface now "activated" is able to adsorb additional non-inert gas species, excluding hydrogen.

During activation, hydrogen is desorbed from the getter material and is released into vacuum housing 32. However, that hydrogen can be reabsorbed by NEG pump 37 after the activation process has been completed and the getter material cools. When some hydrogen desorbs in the reactivation process, the hydrogen partial pressure inside the flywheel chamber 32 can increase. However, hydrogen is a small molecule and exerts relatively little drag, and, because the flywheel is constructed of steel, the flywheel is not in danger of a catastrophic failure. Steel has a much higher thermal conductivity to transfer surface gas friction heating, a larger thermal mass to absorb the heat energy and also hundreds of degrees higher temperature capability than composites. The steel flywheel also typically operates with a slower peripheral speed than the composite flywheel so less heat is generated. Because of this, the vacuum system of the flywheel power source can safely be regenerated without discharging the flywheel.

Although a getter material is available in the form of thin, coated strips, which typically preferred because they can pump faster per amount of material due to greater exposed surface area, use of getter material in the form of pellets minimizes the cost and also increases the total gas sorbing capacity over the life of the flywheel system. In one embodiment of the invention, the non-evaporable getter of the steel flywheel system is reactivated through the triggering from a timer. Because vacuum gauges such as thermocouple type and ion gauges add extra cost and are likely unreliable to last the desired life the flywheel power source, they are preferably eliminated. A timer is then used to trigger reactivation of the getter which is made possible by knowing the outgas rates of the different gas species inside the flywheel chamber. A residual gas analyzer, not shown, temporarily connected to the inlet port 36 can perform this function.

In a further embodiment of the invention, the flywheel electronics 45 are used to prevent maintaining or achieving full flywheel speed, thereby limiting the flywheel speed if the chamber pressure or drag is too high. Because the flywheel is constructed of steel and unlikely to overheat, the speed limiting can be done using simple current limiting to the motor. Another method that can be employed is for the electronics to calculate if the drag is higher than allowable at any given speed by measuring the motor power or current, flywheel speed and flywheel acceleration. This method can determine an inadequate vacuum prior to achieving full speed or alternatively detect increased drag resulting from other components including the motor/generator or bearings. The detection of increased drag can be used to trigger an alarm and even be used to trigger reactivation of the vacuum.

In order to initially establish a vacuum inside the chamber 32, the external vacuum pumping system 20 is preferably used. This allows establishment of an initial high vacuum and prevents unnecessarily using up the getter pump 37. The vacuum-pumping system 20 can be comprised of combined diaphragm and turbo-drag pump 21, ultra-high vacuum Bayard-Alpert ion gauge 22, right-angle valve 23, bellows 24 and connection tube 25. Combined oil-free diaphragm and turbo-drag pump 21, are preferably chosen to avoid the possibility of oil contamination of energy storage flywheel system 30 via backstreaming. Other oil free pumps could also be used and oil type pumps might be applicable if a sufficient trap could be made, however this is less preferable. The vacuum pumping system 20 reduces the pressure in energy storage flywheel system 20 from 1 atmosphere (760 torr) to $10^{-6}$ torr. Ultra-high vacuum Bayard-Alpert ion gauge 22 is used to measure the pressure of the system. Right-angle valve 23 is used to isolate ultra-high vacuum Bayard-Alpert ion gauge 22 from atmospheric pressure when vacuum inlet port 36 is crimped from connection tube 25. If the gauge were to be exposed to atmospheric pressure while energized, it would be destroyed. In addition, right-angle valve 23 minimizes the amount of water-vapor contamination to which vacuum-pumping system 20 is exposed, thereby improving the efficiency of vacuum-pumping system 20. Bellows 24 is a flexible-piping element that is used to avoid problems associated with the misalignment between the two independent systems 20 and 30. The function of connection tube 25 was previously described.

The following describes the procedure for establishing vacuum in the flywheel power source 30. Each component of energy storage flywheel system 30 must be thoroughly cleaned during assembly to remove all sources of contamination, in particular all greases and oils. Once the energy storage flywheel system 30 is assembled and is connected to vacuum-pumping system 20, it is preferable if energy storage flywheel system 30 is heated uniformly to the maxim temperature to which its components can withstand without loss or degradation of their performance. This elevated temperature "bakeout" will increase the mobility of gas molecules on the internal free surfaces of energy storage wheel system 30, thereby increasing their desorption rate. Once the temperature within energy storage flywheel system 30 is uniform, vacuum pump 21 is used to reduce the pressures within vacuum housing 32. The higher initial desorption rate of this vacuum baking process increases the number of gas molecules that can be removed by vacuum pump 21, thereby decreasing the gas desorption rate after vacuum-pumping system 20 has been disconnected.

Typically, vacuum chambers are vacuum baked at temperatures of 250° C. or greater to reduce, in particular, the water desorption rate to below $10^{-13}$ torr-liters per second per square centimeter of surface area (3.5 million gas molecules per second per square centimeter). However, the motor generator and magnetic bearings, if used, may utilize low cost, high-field strength neodymium-iron-boron magnets. Temperatures above 120° C. can damage and even demagnetize the magnets. Thus, if neodymium-iron-boron magnets are used the maximum bakeout temperature of energy storage flywheel system 30 is linked to 120° C. The water desorption rate of a vacuum chamber after a vacuum bakeout at 120° C. is approximately 20 times greater than the water desorption rate of a 250° C. vacuum bakeout. This higher desorption rate would therefore require 20 times the amount of getter material to be used in NEG pump 37. Once energy storage flywheel system 30 has been evacuated to a pressure level of $10^{-6}$ torr and a long-term gas desorption rate has been determined, non-evaporable getter pump 37 is "activated." It is preferable to activate non-evaporable getter pump 37 while vacuum pump 21 is being utilized to reduce the pressure within system 30. The pressure in vacuum housing 32 should be $10^{-4}$ torr or below before activation. In this invention, it is preferable if a substantial portion of the hydrogen that is desorbed from the getter material during activation is removed from energy storage flywheel system 30 by vacuum pump 21 rather than readsorbed by NEG pump 37. This process will maximize the absorption capacity of non-evaporable getter pump 37. Once non-evaporable getter pump 37 has been activated, right-angle valve 23 is closed to isolate ultra-high vacuum Bayard-Alpert ion gauge 22. Connection tube 25 is then crimped off.

In another embodiment of the invention, the long term outgassing of the flywheel is reduced prior to being assembled in the power source 30. It is preferable to minimize the gas desorption rate of energy storage flywheel system 30 and thereby minimum the size and cost of non-evaporable getter pump 37. As flywheel 31 comprises at least a quarter of the total surface area of system 30, minimization of its gas desorption rate can effectively reduce the gas desorption rate of the entire system Flywheel 31 is preferably 4340, a high-strength alloy steel, or one of its variations. To obtain high strength in the flywheel, the steel must be heat-treated and quenched. The raw round must first be rough machined to remove the carburized scale off of the surface prior to heat treatment. Removing roughly 0.300 inches from the surface ensures removal of any seams in the steel that can potentially crack the round upon quenching. Heat treatment is then usually performed at 1500–1600° F. for roughly 30 minutes per inch in diameter. The quenching method depends on the alloy of steel. Oil or liquid polymer quenching is typical for 4340.

After quenching, the round must be tempered to increase the toughness of the steel and to relieve internal residual stresses. In accordance with the invention, the steel tempering can be combined with the outgas baking of the flywheel for the benefits of significantly more gas removal and reduction of the flywheel outgassing in operation at the same time as the steel toughness is being increased. The tempering is therefore done in a vacuum. The pressure in the chamber is preferably $10^{-4}$ torr, or lower, so as to sufficiently remove the gases from the steel. At the elevated tempering temperature, typically between 800 and 1200 F, the mobility of the gasses in the steel is greatly increased. When combined with the low chamber pressure, a high rate of gas desorption from the metal occurs. Vacuum furnaces to conduct this procedure are readily available at many heat-treating companies although they are normally used for different purposes. Vacuum furnaces have typically been used for solution treating stainless steels or for bright hardening, which yields an attractive and improved surface that would otherwise be discolored from conventional atmospheric heat treatment. The tempering of the flywheel round is preferably conducted for roughly 1 hour per inch of diameter to insure adequate heating and equalizing of the internal structure. For a 4340 steel round, 1000° F. tempering temperature yields a good combination of strength and toughness of the steel. At this temperature, the gas desorption rate is expected to be roughly 100 times more than if vacuum baking was done later at only 800° F.

Vacuum furnaces typically heat parts under vacuum and then cool the parts by gas circulation. Nitrogen or argon is typically used. For flywheels, argon is preferably used because all noble gases are completely insoluble in metals and thus no further gas will be absorbed during cool down from the high temperature. However, argon is much more expensive than nitrogen. The cool down time can be as short as a couple of minutes compared to the more than 10 hours if the steel flywheel material was cooled under vacuum. Therefore if nitrogen is used as the cooling gas, it is unlikely that a significant amount will be absorbed into the metal bulk When steel and other nitride-forming metals are heated in nitrogen, the amount of nitrogen, which act enters into solution, is of the order of 1 per cent or less by weight, and there is no tendency to form a nitride. Hydrogen, carbon monoxide and carbon dioxide typically diffuse from the bulk at 2250° F. and lower, whereas the removal of nitrogen and oxygen requires much higher temperatures. The temperature where this cooling could also be done in vacuum by letting the steel round cool for many hours but it is expensive to use the vacuum furnace for such a long period of time. The primary gases removed from the steel during the treatment are hydrogen, carbon monoxide and carbon dioxide. After the flywheel preparation treatment is completed, the steel round is then machined into flywheel 31. This flywheel preparation treatment could also be applied to other components of the flywheel power source that also require quenching and tempering to meet their required service properties.

Assuming that windage losses are acceptable for a given flywheel system at a maximum vacuum chamber pressure of $10^{-2}$ Torr, FIGS. 2A–C, 3A–C and 4A–C illustrate the advantage of integrated and reactivatable non-evaporable getter pump of the invention and the benefits of repeatedly reactivating the getter material during the life of the flywheel power source 30. As described prior, the hydrogen is absorbed directly into the center of the getter pellets. However, the gasses of other species with larger molecules are adsorbed onto the getter surface. Once the getter surface is fill, the pumping action slows or stops. The getter then needs to be reactivated by heating which allows the larger molecules to be absorbed also to the center of the getter material, leaving fresh surfaces for adsorption One of the major gas components that outgases from the flywheel and chamber, and is not absorbed by the getter like hydrogen, is carbon monoxide.

Figure 2A:
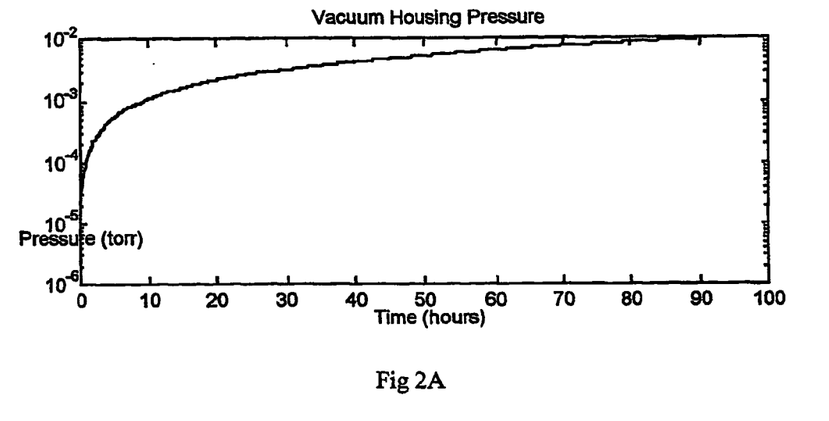
FIGS. 2A–2C are graphs of the vacuum housing pressure, getter gas adsorption and getter pumping speed without a non-evaporable getter pump.
Figure 2B:
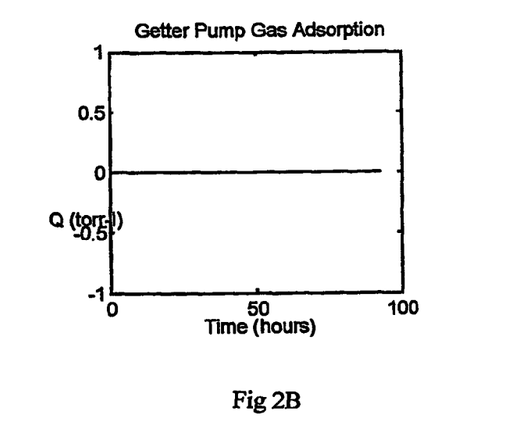
Figure 2C:
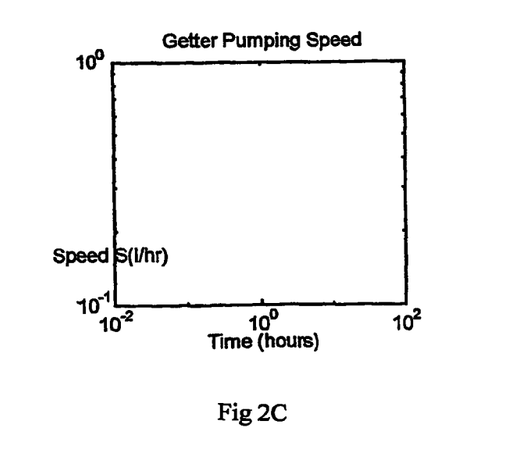
Figure 3A:
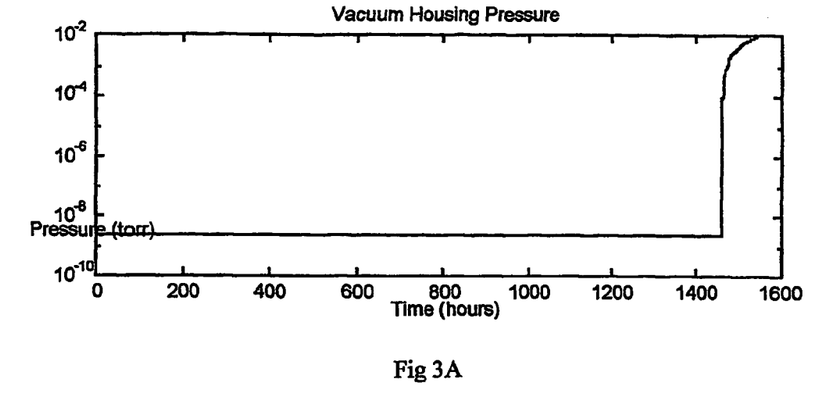
FIG. 3A–3C are graphs of the vacuum housing pressure, getter gas adsorption and getter pumping speed with a non-evaporable getter pump that is activated but once.
Figure 3B:
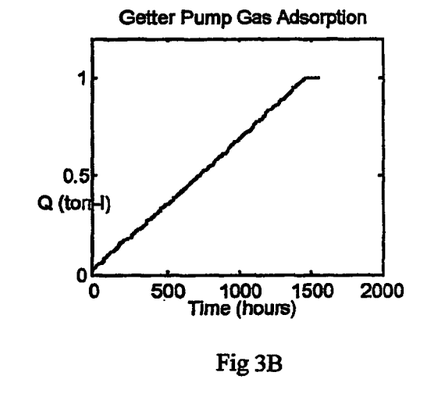
Figure 3C:
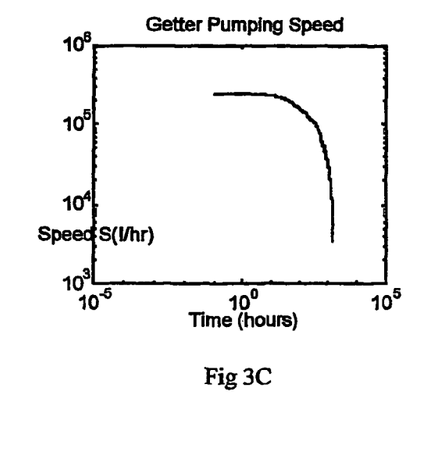
Figure 4A:
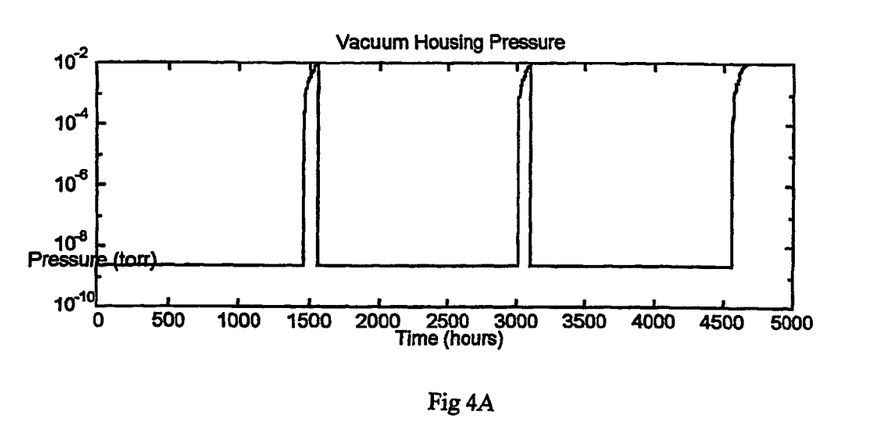
FIGS. 4A–4C are graphs of the vacuum housing pressure, getter gas adsorption and getter pumping speed with a non-evaporable getter pump that is repeatedly reactivated

FIGS. 2A, 3A and 4A show plots of the chamber pressure from outgassing from the flywheel and internal surfaces of the chamber along with the quantity of gas that is adsorbed by the getter material and the getter pumping speed of the gas. FIGS. 2A–C shows the case of a flywheel power source without the getter pump and not in accordance with the invention Consequently, the amount of gas adsorbed remains at 0 torr-liters and the speed at which it is adsorbed is 0 liters per hour. More importantly, the vacuum chamber reaches the maximum chosen acceptable pressure of $10^{-2}$ Torr in approximately 90 hours, far less than the desired 20 years (approximately 175000 hours). FIGS. 3A–C show the same flywheel power source with the inclusion of the non-evaporable getter pump in accordance with the invention. The pressure in the chamber quickly drops from $10^{-6}$ to $10^{-9}$ Torr after the non-evaporable getter is activated. It remains at this pressure for more than 1400 hours until the surface are of the getter material becomes saturated, as indicated by the rapid drop off in pumping speed. Approximately 90 hours after the surface of the getter material becomes saturated, the maximum acceptable pressure is reached. While the pressure in the chamber remains below the acceptable pressure for a period of time that is 15 times longer that without the getter, the duration is still insufficient using the chosen conditions.

Figure 4B:
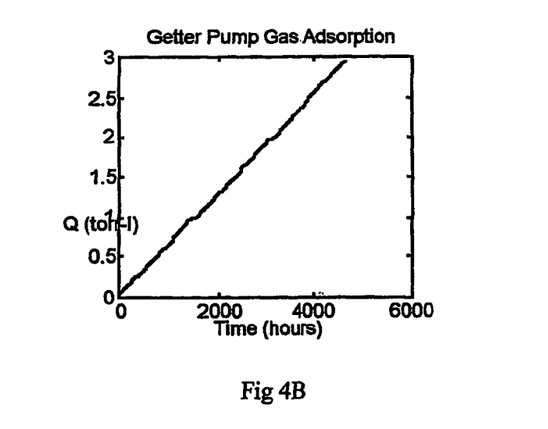
Figure 4C:
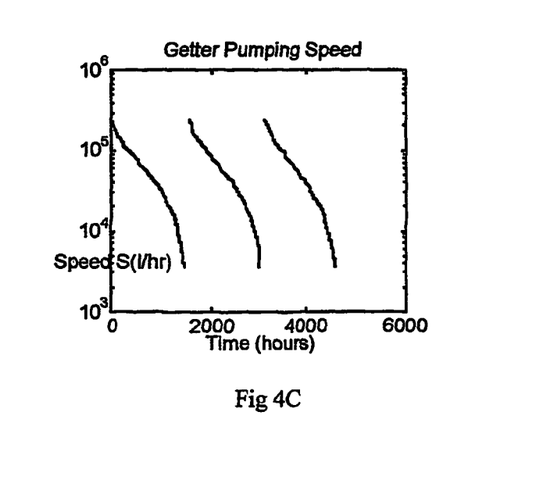

It is possible to increase the amount of getter material from a few grams to several kilograms and thereby achieve the 20 year life, but at higher than desirable cost. It is therefore preferable to regularly reactivate the getter material in the flywheel power source. This differs from the application of getters in typical static systems such as vacuum bottles where they are activated only once and the heat source is typically external and removed from the product after activation. For other applications that allow reactivation of non-evaporable getters it is also usually only done for process applications where the getter material is easily replaceable after being exhausted and not in a sealed commercial products, such as a flywheel systems. FIGS. 4A–C show the flywheel power source with the non-evaporable getter pump in accordance with the invention and using the further embodiment of regular reactivation using an integral heater. As illustrated, once the pressure reaches the maximum acceptable pressure, the getter material is reactivated and the pressure returns to a quasi-equilibrium with adequate vacuum level. The getter material can be regularly reactivated to achieve the 20 year life or until exhausted.

Obviously, numerous modifications and variations of the described preferred embodiment are possible and will occur to those skilled in the art in light of this disclosure of the invention.

We claim:

1. A vacuum system for a flywheel power source comprising:
   a metal chamber having walls with a thickness sufficient to resist atmospheric pressure when said chamber is evacuated;
   an energy storage flywheel constructed of steel and supported on a bearing system mounted in said chamber for rotation about an axis;
   a motor/generator coupled to said flywheel for accelerating and decelerating said flywheel for storing and retrieving energy;
   said chamber being maintained at low pressure for the life of the flywheel power source by the use of a nonevaporable metal alloy chemical type getter;
   an electric heater in heat conducting relationship to said getter and connected in a circuit to a source of electrical energy for energizing said electric heater when required to activate and reactive said getter material.

2. A vacuum system for a flywheel power source as described in claim 1, further comprising:
   a timer in said circuit for connecting said source of electrical energy to said electric heater when reactivation of said getter is required.

3. A method for establishing and maintaining a vacuum in a flywheel power source that employs a steel flywheel coupled to a motor/generator and housed in a metal chamber, comprising:
   assembling said flywheel inside said chamber and sealing said chamber;
   heating said entire chamber to at least about 120 degrees F. while pulling a vacuum on said chamber for removal of internal gasses, contaminants and water vapor using a connection to an external vacuum pump;
   establishing communication between a separate vacuum pump and said chamber, said separate vacuum pump having a chemical type metal alloy nonevaporable getter material that can be activated by heating said getter material; and
   closing said vacuum connection between said chamber and said external vacuum pump and sealing said chamber completely.

4. A method for establishing and maintaining vacuum as describe in claim 3 wherein:
   reheating said getter during the life of said flywheel power source to reactivate said getter material through the use of a heater that is integral with the flywheel power source.

5. A method for establishing and maintaining vacuum as described in claim 4 wherein:
   the reactivation of the getter is triggered by a timer.

6. A method for establishing and maintaining vacuum as described in claim 4 wherein:
   energizing said heater using energy produced in said generator from said spinning flywheel.

7. A flywheel power source comprising:
   an energy storage steel flywheel supported on a bearing system for rotating about an axis;
   a motor/generator coupled to said flywheel for accelerating and decelerating the flywheel for storing and retrieving energy;
   a metal chamber surrounding said flywheel and adapted to be evacuated and maintained at a low pressure;
   electronics are connected to said motor for charging said flywheel by energizing said motor of said motor/generator, said electronics having detectors for detecting when the drag on said flywheel is normal, and thereafter preventing maintaining or achieving full speed.

8. A flywheel power source as described in claim 7 wherein:
   said prevention of maintaining or achieving full speed is achieved by current limiting to said motor.

9. A flywheel power source comprising:
   an energy storage flywheel constructed of steel and supported on a bearing system for rotation about an axis,
   a motor/generator is coupled to said flywheel for accelerating and decelerating the flywheel for storing and retrieving energy,
   a metal chamber enclosing said flywheel and maintained at a low pressure,
   electronics for controlling the charging and discharging of said flywheel power source, said electronics having a detector that activates a signal when aerodynamic drag on said flywheel is detected to be above normal.

10. A flywheel power source as described in claim 9 wherein:
    said detector detects above normal drag on said flywheel at a speed lower than full operating speed of said flywheel by the electronics calculation using the motor power, rotational speed and the flywheel acceleration.

11. A flywheel power source as described in claim 9, wherein:
    said flywheel includes a rotor having a principal rotating mass of steel, and said signal triggers reactivation of a chemical type metal alloy nonevaporable getter material by activating a heater in thermal contact with said getter material for heating said getter material to reduce said pressure and reduce said aerodynamic drag.

12. A method for maintaining vacuum in a flywheel power source having an energy storage flywheel coupled to a motor/generator for accelerating and decelerating the flywheel for storing and retrieving energy and supported on a bearing system for rotation inside a vacuum chamber enclosing said flywheel and maintained at a low pressure, comprising:
    determining an occurrence of increased pressure above a predetermined threshold inside said vacuum chamber with use of said flywheel motor power, flywheel speed and flywheel acceleration; and
    triggering the vacuum to be reestablished upon said determination of increased pressure.

13. A method as described in claim 12, wherein:
    said vacuum is reestablished by reactivating a chemical type metal alloy nonevaporable getter through use of a heater.

14. A method as described in claim 12 wherein:
said flywheel has a steel rotor and said increased pressure inside said vacuum chamber is less than $10^{-3}$ Torr.

15. A method as described in claim 12 wherein:
said steel flywheel has a steel rotor that has been tempered by heating said solid steel rotor to a temperature of between 800° F. and 1200° F. and holding it at that temperature for more than one hour.

16. A method as described in claim 12 wherein:
said electronics of said flywheel power source prevent said motor from maintaining full speed of said flywheel when the pressure in the vacuum chamber exceeds a predetermined minimum pressure, as determined by increased aerodynamic drag on said flywheel.

17. A method as described in claim 16 wherein:
said electronics limit current to the motor when said pressure in said vacuum chamber exceeds said predetermined minimum pressure.

18. A method for reducing outgassing from elements of an energy storage flywheel system having a forged and quenched steel flywheel and a metal container for holding said flywheel and adapted to be evacuated to provide an evacuated space in which said flywheel can spin at high speed with little aerodynamic drag, comprising:
tempering said flywheel material in a vacuum.

19. A method as described in claim 18, further comprising:
tempering said metal container in a vacuum.

20. A method as described in claim 18 wherein:
said forged steel flywheel is heat treated at above about 1500° F. and then is tempered in said tempering step; and
said tempering step includes heating said steel flywheel to a temperature of between 800° F. and 1200° F. and holding it at that temperature for more than one hour at a pressure of no greater than about $10^{-4}$ Torr.

* * * * *